United States Patent [19]

Frisk

[11] 4,312,441
[45] Jan. 26, 1982

[54] APPARATUS FOR REMOVING PARTICULATE MATERIAL FROM A PILE

[75] Inventor: Olof E. Frisk, Järved, Sweden

[73] Assignee: Mo och Domsjo Aktiebolag, Ornskoldsvik, Sweden

[21] Appl. No.: 174,318

[22] Filed: Aug. 1, 1980

[51] Int. Cl.³ .................................... B65G 65/02
[52] U.S. Cl. ............................. 198/519; 414/133
[58] Field of Search .......... 198/511, 517, 519, 321, 198/506, 508; 414/133

[56] References Cited

U.S. PATENT DOCUMENTS 3,298,749  1/1967  Croon et al. .................. 414/133 X

FOREIGN PATENT DOCUMENTS 2627522  12/1977  Fed. Rep. of Germany ...... 414/133

Primary Examiner—Robert B. Reeves
Assistant Examiner—Douglas D. Watts

[57] ABSTRACT

Apparatus is provided for removing particulate material, such as wood chips, bark, municipal waste or industrial waste, from a pile thereof, comprising a support extending along the base of the pile and a carriage movable on the support along its longitudinal axis. Mounted on the carriage are an elongated scraper for scraping material from the pile, and a conveyor for collecting and carrying away particulate material scraped down from the pile.

10 Claims, 5 Drawing Figures

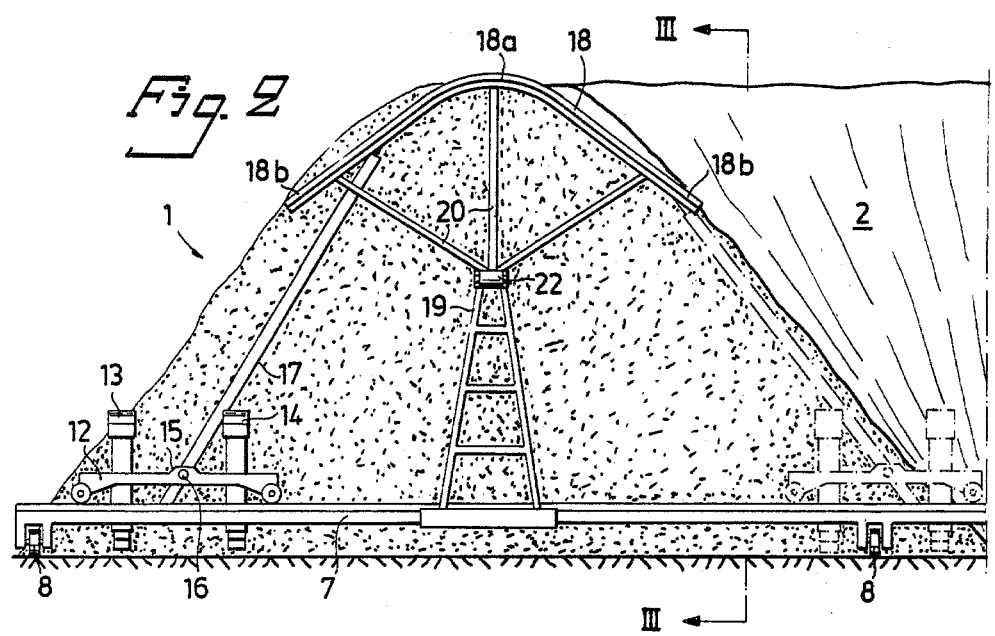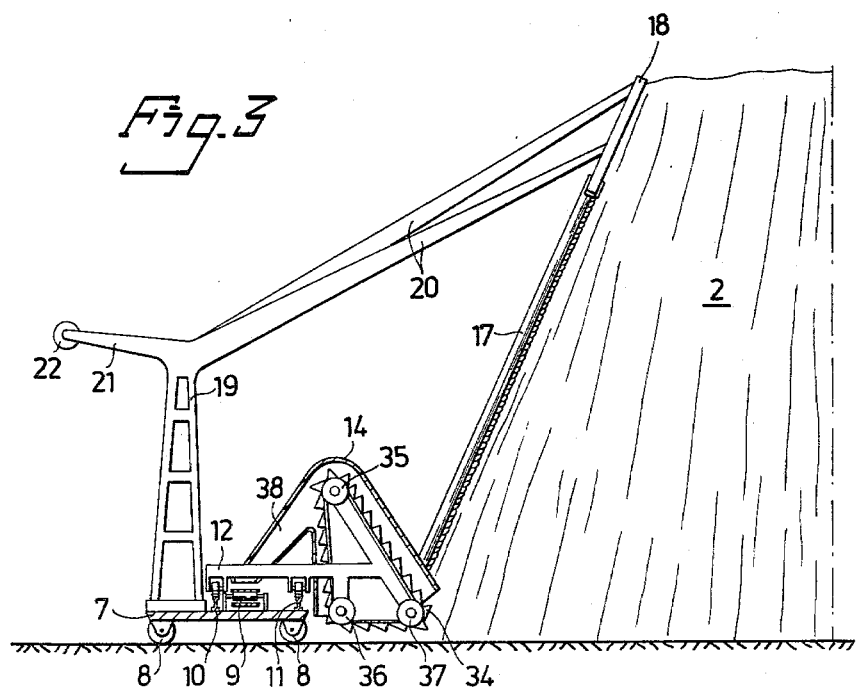

APPARATUS FOR REMOVING PARTICULATE MATERIAL FROM A PILE

Apparatus for removing particulate material from a pile normally have a scraper carried on wheels so as to be movable towards and away from the pile, towards and away from a position to scrape material therefrom. The scraper may comprise rotary or oscillating scrapers arranged one above the other on a shaft in a protective tube. On the side facing the pile the protective tube is provided with a longitudinal pile slot or opening through which the scraper comes into contact with the pile. The scraper is often mounted on the carriage between two bucket elevator scoops. The scoops pick up the material scraped down from the pile, and carry the material up to a belt conveyor arranged on the support, for transport of the material away from the pile.

Arrangements are also known in which the scraper can pivot or rotate in the scraping plane along the side of the pile. Such an embodiment is disclosed, for example, in German Offenlegungsschrift No. 2,461,756. This specification illustrates and describes a scraper which is pivotably or rotatably arranged, via a ball coupling, on a slide, which can be moved along the base of the pile, and in its upper part is axially movable in a sleeve which is suspended from a stationary frame via a universal joint. During movement of the slide, the lower end of the scraper is moved with the slide, while the upper part of the scraper is moved axially in the sleeve, which rotates in the stationary frame, thereby causing the scraper to rotate in the scraping plane.

This apparatus gives a more effective scraping than in the case where the scrapers are fixed. This is particularly true when the scraper is moved laterally to a position adjacent the ends of the pile, since by rotating the scraper in a direction opposite to the direction of movement there is obtained a considerably larger area of contact with the pile than in the case of scrapers which cannot be rotated.

The same advantage is afforded by the apparatus illustrated and described in German Offenlegungsschrift No. 2,305,106. This specification illustrates a scraper which in one embodiment comprises an upper and a lower unit, of which units, however, only the upper is rotatable in the scraping plane. The scraper is rotated by means of a motor via a gear drive arrangement connected to the upper unit. In another embodiment of the scraper, the scraper extends from the base of the pile of material to the top thereof, and is pivotably or rotatably arranged in the scraping plane, approximately centrally of its ends.

These scrapers have disadvantages limiting their usefulness for removal of material from relatively small piles. In the first mentioned apparatus, the length of the scraper must be such as to enable the scraper to reach remote portions of the pile from its point of rotation in the stationary frame. Thus, the length of the scraper corresponds to approximately half the span of the pile of material in the ground plane. Such a scraper can be used effectively with piles of reasonable size, i.e. having a ground span or diameter of about 40 to 50 meters. Piles storing material of the aforementioned kind outdoors, however, are often larger, and have a ground span or diameter which at times exceeds 150 meters. A scraper whose length corresponds to half this distance, taking into account the angle of repose of the pile, would be unreasonably large, and impossible to handle or to be made self-supporting.

In the other of the aforedescribed apparatus the scraper comprises two units, one above the other, in which only the upper unit is rotatable in the scraping plane. The lower scraper unit of this scraper arrangement has the same disadvantages as a scraper which is not rotatable in the scraping plane. If the pile of material has four or more sides, and displays pronounced edges between the sides—as is usually the case—the upper scraper, when moved laterally towards one of the side edges of the pile, will be located outside the pile before the lower scraper unit has reached the side edge in question. During the continued lateral movement of the scraper, only the lower scraper unit will be in contact with the pile over a contact surface and with a scraping effect, which, due to the inward slope of the pile, decreases the nearer the scraper approaches the lower corner of the side edge. The higher the pile, the greater this reduction in scraping effect. Consequently, such scrapers are unsuitable for large piles.

Scrapers which are mounted for rotation at their centers are also unsuitable for use with large piles of material. Because the scraper is only supported at its point of rotation, the lower end of the scraper is lifted upwardly when the scraper rotates. This makes a gap between the scraper and the ground, in which gap no scraping is carried out. In smaller piles, this has no appreciable significance. In larger and higher piles, however, the fact that no scraping is carried out in a part of a side may cause the part of the pile located below the rotated scraper to break away and slide down by gravity, and therewith initiate a further, larger slide of the material.

The aforementioned disadvantages are eliminated in the apparatus of the present invention for removing particulate material, such as wood chips, bark, municipal waste and industrial waste, from a pile thereof, comprising a support extending along the base of the pile, and a carriage movable along the support and carrying an elongated scraper for scraping material down from the pile and means for collecting and carrying away the material scraped from said pile. The support has a frame structure fixedly mounted on the central part of the support and extending obliquely upwardly towards the pile, the upper end of which frame structure is provided with an arcuate guide which extends outwardly substantially equidistantly from both sides of the frame structure, in a plane which coincides or approximately coincides with the longitudinal axis of the support. The scraper at its lower part is rotatably arranged on the carriage in the plane of the arcuate guide, and in its upper part is movable along the guide when the scraper is rotated about its axis of rotation on the carriage, as a result of movement of the carriage.

In the present apparatus, the scraper in its entirety is laterally movable in the scraping plane, and is rotatable in said plane about its vertical axis. This makes the length of the scraper independent of the span or diameter of the pile in the plane of the ground and enables the scraper to be given a maximum contact surface area against the pile, even in the remote positions along the base of the pile.

A preferred embodiment of an apparatus according to the invention is shown in the accompanying drawings, in which:

FIG. 2 is a side view of the feed-out system of FIG. 1, looking towards the feed-out side of the pile;

FIG. 3 is a cross-sectional view of the feed-out system taken along the line III—III of FIG. 2;

The feed-out system 1 shown in FIGS. 1 to 4 is arranged to remove particulate material from a pile 2 thereof located outdoors. By way of example, the pile is shown to be laid down along a circular path, such as a broken ring, to one end of which material is fed by means of a pneumatic feed-in system 3, while material is taken from the other end of the ring by means of the feed-out system 1. While material is being fed to and removed from the broken ring, the two feed systems move continuously and at substantially the same speed around a common center 4 in the center of the ring. The rate of the feed-in and feed-out operations is adjusted so that the feed-in and feed-out locations are continuously displaced in the same direction about the ring, while maintaining the broken opening between them in the ring.

Figure 1:
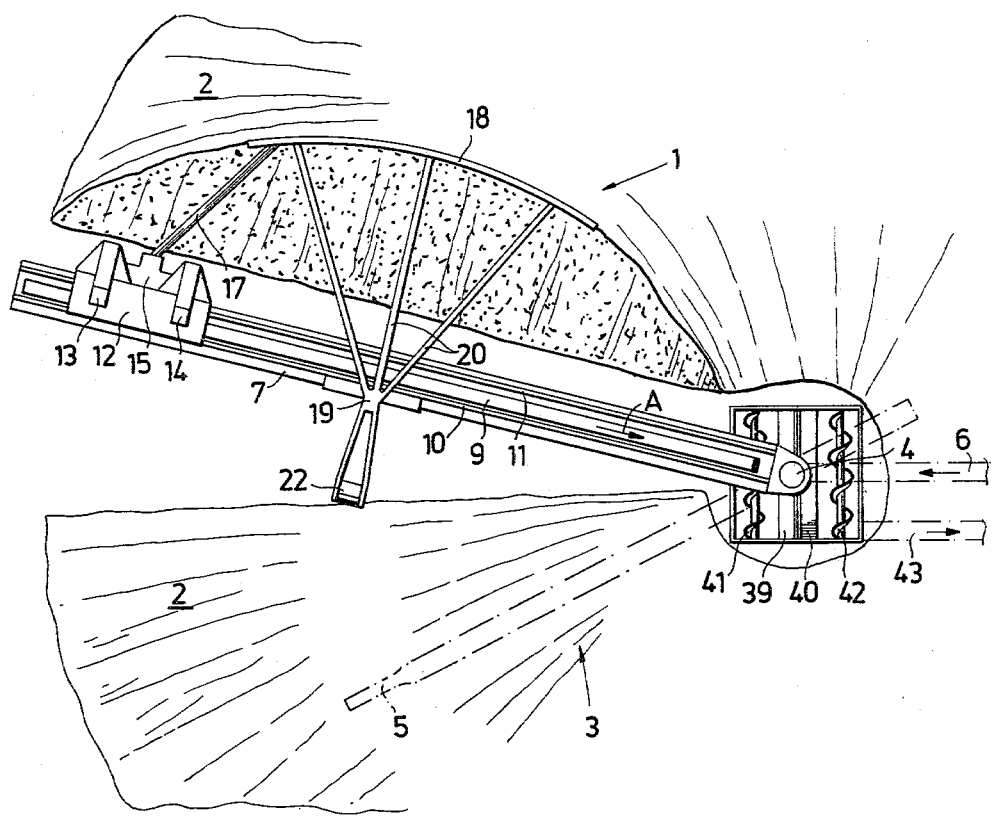
FIG. 1 is a horizontal or top view of the feed-out system, arranged for feeding particulate material from a circular pile thereof.
Figure 4:
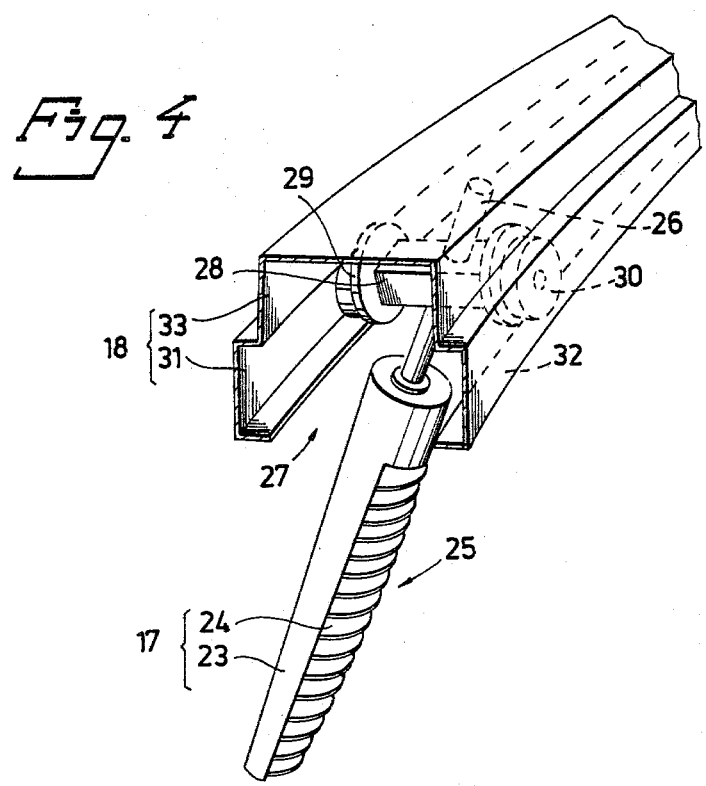
FIG. 4 is a perspective view of the scraper portion of the feed-out system of FIGS. 1 to 3, with the associated guide beam.

The feed-in system 3 does not constitute part of the invention, and is shown only schematically in FIG. 1. The feed-in system comprises a pneumatic conveyor tube 5, which is rotatably mounted at the center 4 of the pile, and can be swung over the laydown area of the pile, while material is blown out of the tube 5. The material is supplied to the conveyor tube 5 in conventional manner, through a supply tube 6 arranged beneath the pile, from a supply source (not shown) located externally of the pile.

The feed-out system 1 includes an elongated frame support 7 which is carried by wheels 8 running on the ground, and which is pivotably arranged about the center 4 in the middle of the ring or pile (see also FIGS. 2 and 3). The support extends from its center of rotation to the outer periphery of the pile, and carries a belt conveyor 9 and a pair of rails 10, 11, on which a carriage 12 is movable along the longitudinal axis of the support. The rails 10, 11 are arranged on both sides of the belt conveyor 9, and extend along the whole length of the support. Mounted on the carriage 12, at a distance from each other, are two bucket elevator scoops 13, 14. A bracket structure 15 is arranged between the bucket elevator scoops, the bracket structure having a ball coupling 16 for a scraper means 17, which is rotatable about the ball coupling and which extends obliquely upwardly from the carriage. The upper end of the scraper means is movable along a guide beam 18, having an upwardly extending arcuate portion 18a which merges with obliquely downwardly extending ends 18b. The guide beam is supported by a frame 19, fixedly mounted on the central part of the support, and stays 20 fixedly mounted in the frame and extending obliquely upwardly transversely of the support. In the opposite direction, the frame has a smaller beam 21, provided with a counterweight 22.

In the illustrated embodiment, the scraper 17 comprises a screw 24 (see FIG. 4) arranged for rotation in a housing 23, the screw being driven by a motor (not shown) in a downward conveying direction. Extending along the whole side of the housing opposite the frame is an opening 25, through which the screw can contact particulate material in the pile when the scraper is brought against the side of the pile. Arranged in the upper end of the housing is an upwardly extending shaft 26. The shaft 26 extends, via an elongated opening 27 in the underside of the guide beam 18, through a hole in a shaft 28 which is rectangular in cross-section, and which is movable along the guide beam. The shaft 28 is provided at the ends thereof with two loosely journalled wheels 29, 30, which, when the shaft is moved, run along parallel tracks 31, 32 in the guide beam.

Each of the tracks has the cross-sectional shape of a recumbent U, with the distances between the legs corresponding to the U-shape being slightly greater than the diameter of the wheels. Arranged on the upper side of the guide beam is a cover structure 33 which extends along the whole of the guide beam and beneath which the shaft 26 on the casing of the scraper can pass when moved upwardly through the shaft 28 (in a manner described in more detail hereinafter).

The bucket elevator scoops 13, 14 are of conventional construction, having scoops 34 which are pivotably attached to each other in an endless series, and driven by roller 37 over guide rollers 35, 36 in an endless triangular path. This path extends on one long leg immediately over the surface of the ground. Each bucket elevator scoop has a feed-out funnel 38, which discharges, via an opening (not shown) in the carriage 12, over the belt conveyor 9, the conveying direction of which is shown in FIG. 1 by the arrow A.

At the feed-out end of the belt conveyor, there are arranged two funnels 39, 40, the funnels being built together and located adjacent the center of rotation 4 of the support. Each funnel has a rectangular bottom portion in which is located a horizontal conveyor screw 41, 42. The screws are threaded for transport towards one end of the bottom portion, in which end there is arranged a downwardly facing feed-out opening through which material can be fed out to a feed-out belt conveyor 43 located beneath the opening. Thus, beneath the two funnels there has been left space for the rotation center 4, which is common to the support 7 and the feed-in system 3, and which is surrounded on all sides by the funnels. In this way, feed-out of material from the belt conveyor 9 will always take place in the funnels, irrespective of the position to which the belt conveyor is brought when the pier is rotated about its center 4. The belt conveyor 43, which is only shown schematically in FIG. 1, is suitably arranged in a culvert located beneath the pile laydown site, for transport of material through the culvert, away from the pile.

In operation, material is removed from the pile of material after laydown by the feed-in system 3, and after the pile has acquired the shape shown in FIG. 1. Assume that the feed-out system 1 has been brought, in the initial stage of a pile-forming operation, to a position located adjacent the end of the pile first formed. Material is removed from that end of the pile by moving the support 7 around its center 4, so the scraper 17 is brought into position with the rotating screw 24 against the end of the pile. Material is then torn loose from the pile by the screw, and falls down to the ground in the space between the two bucket elevator scoops 13, 14. The carriage 12 is moved slowly along the support 7, so that the scraping of the material from the pile continues, and the material is continuously collected by the bucket elevator scoops 13, 14 and transferred by said elevators to the belt conveyor 9. The belt conveyor transports the material towards the center of the pile site, where it is discharged to the funnels 39, 40 and transferred by the screws 41, 42 to the belt conveyor 43, for transport away from the pile.

As the carriage 12 moves along the support, the scraper 17 is rotated at its lower end about the ball coupling 16 on the carriage, while the upper end of the scraper is moved along the guide beam 18. As the upper end is moved, the two wheels 29, 30 roll in the tracks 31, 32 of the guide beam, while the shaft 26 extending upwardly from the scraper is moved in an axial direction through the hole in the shaft 28. Because of the variable height of the guide beam over the pier, the rotation of the scraper about the ball coupling increases when the scraper is moved from the center of the guide beam to the ends thereof, and is reduced when the scraper is moved in the opposite direction. Thus, when passing the center part of the guide beam, the scraper is rotated in the opposite direction. One advantage afforded by this is that the scraper automatically obtains the maximum contact surface area against the pile, even at the remote locations along the pile. In its upwardly moved position in the guide beam, the shaft 26 extends into the structure 33 arranged on the upper side of the guide beam. Since the wheels 29, 30 are loosely journalled on the shaft 28, the shaft is rotated somewhat about its longitudinal axis as the shaft 26 moves axially. This can be effected without the occurrence of bending forces between the shaft 26 and the hole in the shaft 28.

By arranging for the scraper to be rotatable on the carriage at the lower end of the scraper, and movable along the guide beam at the upper end, the scraper can have a length which is independent of the span or diameter of the pile at the pile-laydown site. As beforementioned, the structure also permits the scraper in its end positions along the pile to adopt a rotary position, with the maximum contact surface area against the pile. This can be seen from FIG. 2, in which the carriage and the scraper are illustrated in dashed lines in the inner end position of the carriage on the support.

A plurality of modifications of the structure can be made within the scope of the invention. For example, the scraper need not necessarily be of the kind described in the illustrated embodiment, with a rotating screw. Any suitable kind of scraper whatsoever can be used. For example, the scraper may be an elongated device arranged to execute oscillating scraping movements, i.e. a scraper provided with a row of scrapers, which can be oscillated along the longitudinal and/or transverse axis of the scraper, or two mutually co-acting screws arranged parallel with one another in a housing.

Since the guide beam must have a length corresponding to the span or diameter of the pile of material, it need not, of course, have exactly the form illustrated in the drawings. It may also be necessary in the case of particularly large piles to extend the guide beam, and to arrange the same on two or more frame structures fixedly mounted along the support.

Figure 5:
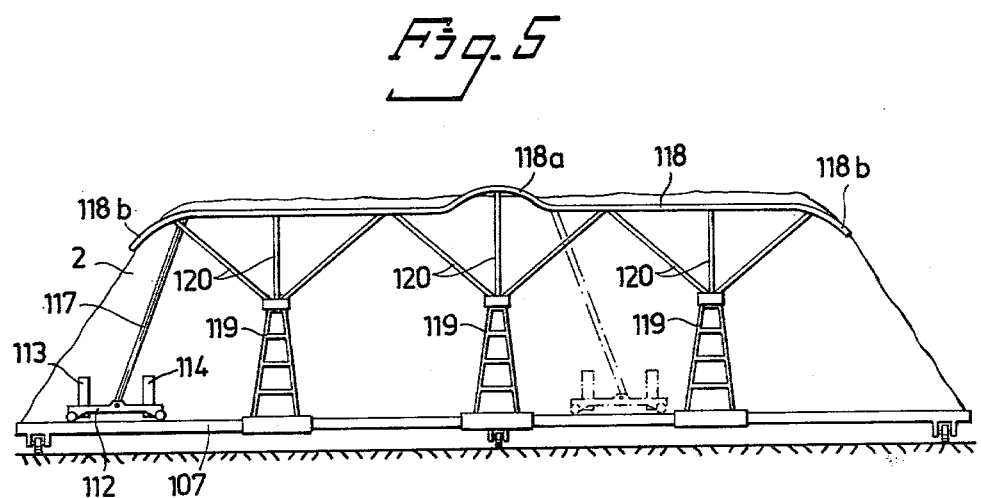
FIG. 5 illustrates a further embodiment of the feed-out system looking towards the feed-out side of a pile of particulate material.

One such embodiment having an extended guide beam carried by three frame structures is illustrated in FIG. 5 with scraper means 117, guide beam 118, and frame structures 119, 120, support 107, a carriage 112, movable along the support, and bucket elevator scoops 113, 114 on the carriage. In FIG. 5 the carriage 112 is shown in two different positions, in full lines and dashed lines, respectively. When the scraper means 117 passes the arcuate part 118a at the center of the guide beam 118, as the carriage is moved along the pier 107, the direction of rotation of the scraper means is automatically changed. As in the first-described embodiment of the invention, this takes place so that the scraper means constantly slopes in towards the center of the support, regardless of the half of the support on which the carriage is located. When the scraper means is moved along the obliquely, downwardly extending ends 118b of the guide beam, the scraper means continues to rotate in the same direction of rotation. In this way, the scraper is given a maximum contact surface area against the pile, as with the previously described embodiment, even when at the most remote parts of the pile.

In the first-described embodiment the scraper is mounted on a support which is pivotably mounted at one end thereof in the center of a ring-shaped pile site. The use of the scraper, however, is not limited to the configuration of the pile illustrated, but can be used efficiently with any pile configuration. In the case of a pile which is not ring-shaped, i.e. a site having a flat laydown surface that is completely covered, the support is suitably arranged for rectilinear movement along its transverse axis, instead of being rotatable.

Further, the guide beam need not have the illustrated configuration, e.g. with downwardly extending ends, but may be provided with outwardly extending straight portions, which merge with an arcuate center portion. In such an embodiment, the scraper means is given its maximum rotary position when it passes through the arcuate part of the guide beam, and maintains this position unchanged during its movement towards the ends of the guide beam.

In addition to bucket elevator scoops, screw conveyors or pneumatic conveying means can be used for removing material scraped down from the pile by the scraper means.

While the illustrated apparatus is designed for use with wood chip piles, the apparatus of the invention can be used for removing any particulate material not normally larger than about 0.5 dm$^3$ in volume such as wood chips, bark, coal, ore, slag, municipal waste or industrial waste, from a pile whose sides are at an angle of at least 40° to the horizontal.

Having regard to the foregoing disclosure, the following is claimed as the inventive and patentable embodiments thereof:

1. Apparatus for removing particulate material having a volume not exceeding about 0.5 dm$^3$ from a pile thereof, comprising, in combination,
    (1) a support extending along the base of the pile;
    (2) a carriage movable along the support and carrying;
    (3) an elongated scraper for scraping material down from the pile; and
    (4) means for collecting and carrying away the material scraped from said pile;
    (5) the support having a frame structure fixedly mounted on a central part of the support and extending upwardly towards the pile, the upper end of said frame structure having an arcuate guide which extends outwardly substantially equidistantly from both sides of the frame structure, in a plane which at least approximately coincides with the longitudinal axis of the support; and
    (6) the scraper at its lower part being rotatably arranged on the carriage in the plane of the arcuate guide, and in its upper part being movable along the guide when the scraper is rotated about its axis of rotation on the carriage, as a result of movement of the carriage.

2. Apparatus according to claim 1, in which the scraper is laterally movable in the scraping plane, and is rotatable in said plane about its vertical axis, so that the length of the scraper is independent of the span of the pile in the plane of the ground, whereby the scraper can contact the pile over an extended surface area even in remote positions along the base of the pile.

3. Apparatus according to claim 1 in which the guide has end parts directed obliquely downwardly in a plane coinciding with the plane of curvature of the arcuate portion.

4. Apparatus according to claim 3 in which the downwardly extending end parts of the guide merge in the arcuate portion with intermediate parts of the guide.

5. Apparatus according to claim 4 in which the downwardly extending end parts of the guide each merge in the arcuate portion via a substantially horizontal part of the guide.

6. Apparatus according to claim 1 in which the parts of the guide located between the arcuate part of the guide and the ends thereof are substantially horizontal.

7. Apparatus according to claim 1 having a track extending along the guide and the scraper means being axially movable at one end through a connector having wheels which move along the track when the scraper means is moved along the guide.

8. Apparatus according to claim 1 having a ball coupling mounted on said carriage and the scraper means rotatably mounted on the coupling.

9. Apparatus according to claim 1, in which the support is arranged for rotation at one end thereof around a ring-shaped pile site.

10. Apparatus according to claim 1 in which the support is movable transversely of its longitudinal axis along a substantially straight path.

* * * * *